United States Patent
Chien-Chuan

[11] Patent Number: 5,967,188
[45] Date of Patent: Oct. 19, 1999

[54] DISTRIBUTION VALVE ASSEMBLY

[76] Inventor: Cheng Chien-Chuan, 5F, No. 6, Lane 110, Kang-Lo St., Nei-Hu, Taipei, Taiwan

[21] Appl. No.: 09/069,082

[22] Filed: Apr. 28, 1998

[51] Int. Cl.$^6$ .................................................. F16K 11/00
[52] U.S. Cl. ........................................... 137/883; 137/861
[58] Field of Search ...................................... 137/883, 861

[56] References Cited

U.S. PATENT DOCUMENTS

| | | | |
|---|---|---|---|
| 456,546 | 7/1891 | Blankerts | 137/883 |
| 3,459,221 | 8/1969 | Axelrod | 137/883 |
| 3,625,474 | 12/1971 | Juede | 137/883 X |
| 3,785,403 | 1/1974 | Kirk | 137/883 X |
| 4,175,590 | 11/1979 | Grandclement | 137/883 |
| 4,721,133 | 1/1988 | Sundblom | 137/883 |
| 5,598,869 | 2/1997 | Nelson | 137/883 X |
| 5,605,173 | 2/1997 | Arnaud | 137/883 X |

*Primary Examiner*—John Fox
*Assistant Examiner*—John Bastianelli
*Attorney, Agent, or Firm*—W. Wayne Liauh

[57] ABSTRACT

A distribution valve assembly, particularly to a compact valve which can distribute the air from a single air inlet to a plurality of air outlets, comprises a valve housing and a binding air-duct housing. The valve housing further comprises a plurality of electromagnetic valves to form several independent air-flow devices with corresponding air passages to the air-duct housing. Each independent air-flow device further comprises a first air passage and a second air passage, and a penetrating passage is constructed to connect all second air passages. The penetrating passage has an air inlet connecting a pump at one end and a drain valve at another end. Air flow inside the penetrating valve can then be directed to any air-flow device.

4 Claims, 8 Drawing Sheets

DISTRIBUTION VALVE ASSEMBLY

BACKGROUND OF THE INVENTION (1) Field of the Invention

The invention relates to a distribution valve assembly, and more particularly to a compact valve which can distribute the air from a single air inlet to a plurality of air outlets.

(2) Description of the Prior Art

Conventionally, distribution valves in the art are widely utilized to distribute the air flow. However, previous work is quite complicated and big in structure so that the application scope is limited to some extent. Especially, while cooperating with small-size facility, the clumsy distribution valve in the art likely causes disadvantages in the production, packing, and sales of a whole package; due to the volume, the weigh, and the cost of the conventional distribution valve.

Therefore, an invention devoting to resolving aforesaid disadvantages of the conventional distribution valve is necessary, definitely.

SUMMARY OF THE INVENTION

Accordingly, it is a primary object of the present invention to provide a distribution valve assembly which is small-size, compact-structured, and with concise operation in both air inlet and outlet.

The distribution valve assembly in accordance with the present invention mainly comprises a valve housing and a binding air-duct housing. The valve housing is preferably separated to three cabinets by two dividing plates, and each cabinet can accommodate an electromagnetic valve. The air-duct housing further comprises multiple independent air-flow devices at the locations with respect to every cabinet of the valve housing, for the independent operation of each electromagnetic valve to reasonably carry out the distribution control of the air flow.

Each air-flow device of the air-duct housing further comprises a first air passage and a second air passage whose outlet is controlled by the pin of the corresponding electromagnetic valve, for determining the through connection between the first air passage and the second air passage. Moreover, a penetrating passage inside the air-duct housing is used to connect all second air passages. At one end of the penetrating passage locates the air inlet connected with a pump, and at another end thereof locates a drain valve. Thus, the air flow from the penetrating passage can be successfully directed to any air-flow device of the distribution valve assembly in accordance with the present invention.

All these objects are achieved by the distribution valve assembly described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a distribution valve assembly. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

The distribution valve assembly in accordance with the present invention mainly comprises a valve housing 10 and an air-duct housing 20 bound tightly to the valve housing 10. The valve housing 10 is preferably separated to three cabinets 12 by two dividing plates 11; and inside each cabinet 12, an electromagnetic valve 30 can be firmly accommodated. The air-duct housing 20 further comprises multiple circular cavities 21, one at each location corresponding to each cabinet 12 of the valve housing 10. The circular cavity 21 further includes a through first air passage 22 thereof, and a through second air passage 24 at the central bump 23 of the air-duct housing 20. Further more, a penetrating passage 25 is constructed inside the air-duct housing 20 for connecting all second air passage 24. The penetrating passage 25 has an inlet opening 26 connected with a pump (not shown in FIG.s) at one end, and a drain valve 40 at another end thereof.

Figure 1:
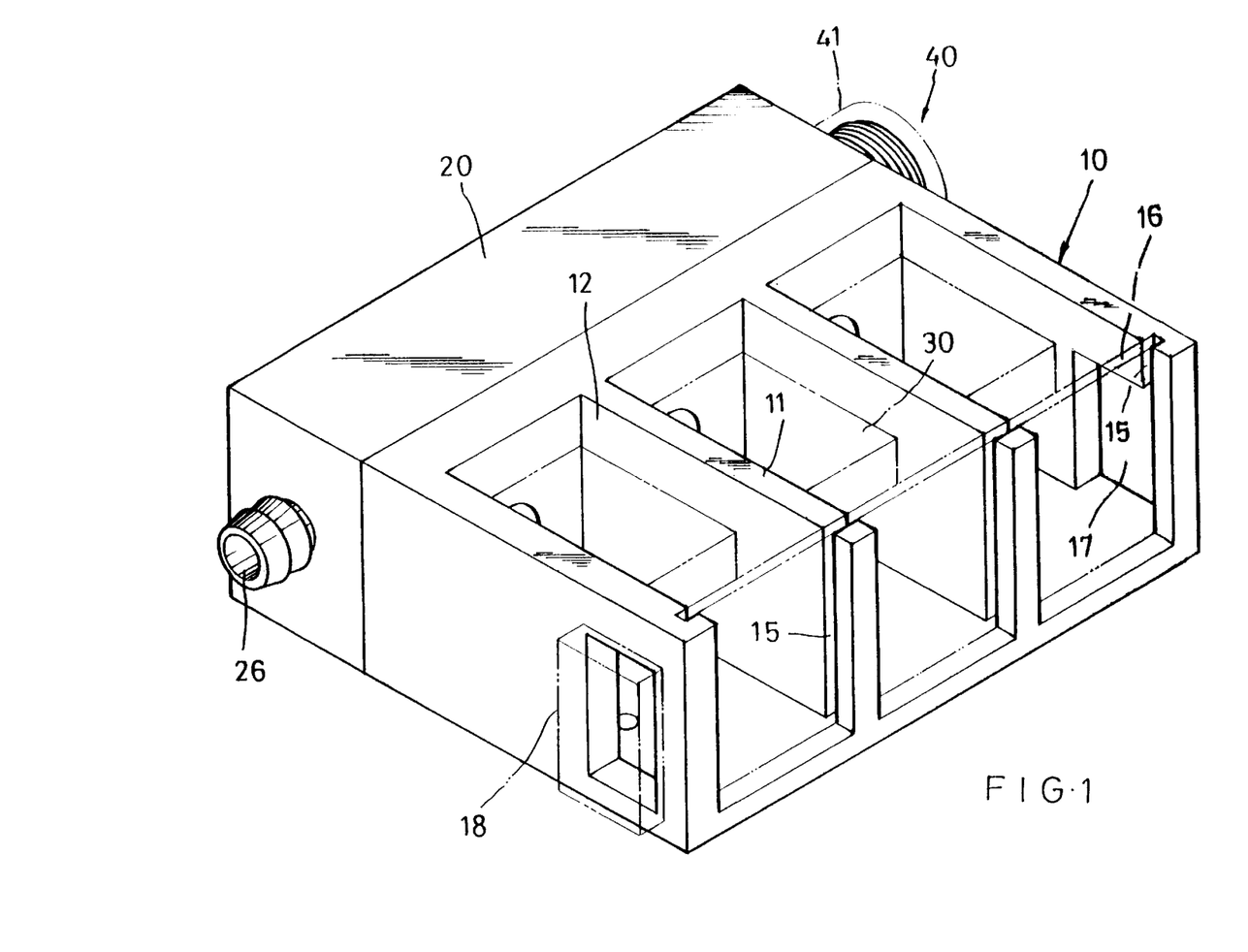
FIG. 1 is a perspective view of the preferred embodiment of the distribution valve assembly in accordance with the present invention.
Figure 2:
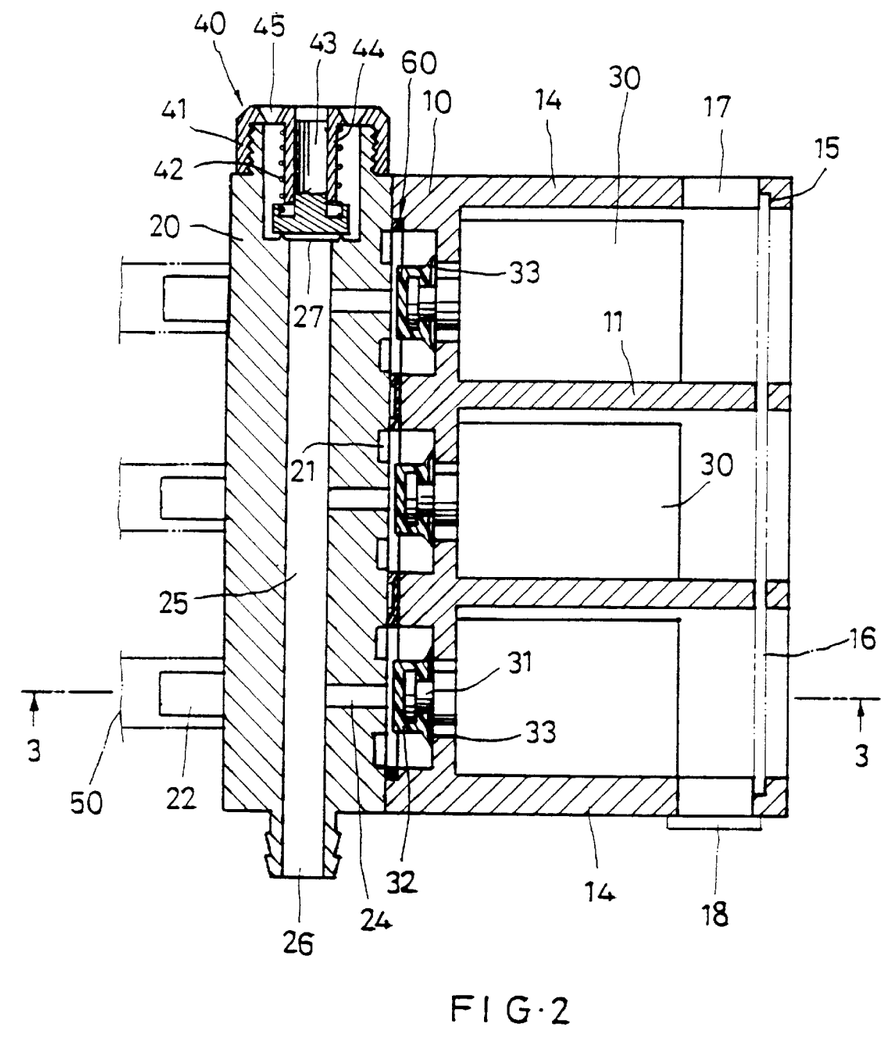
FIG. 2 is a cross-section view of the preferred embodiment of the distribution valve assembly in accordance with the present invention.
Figure 3:
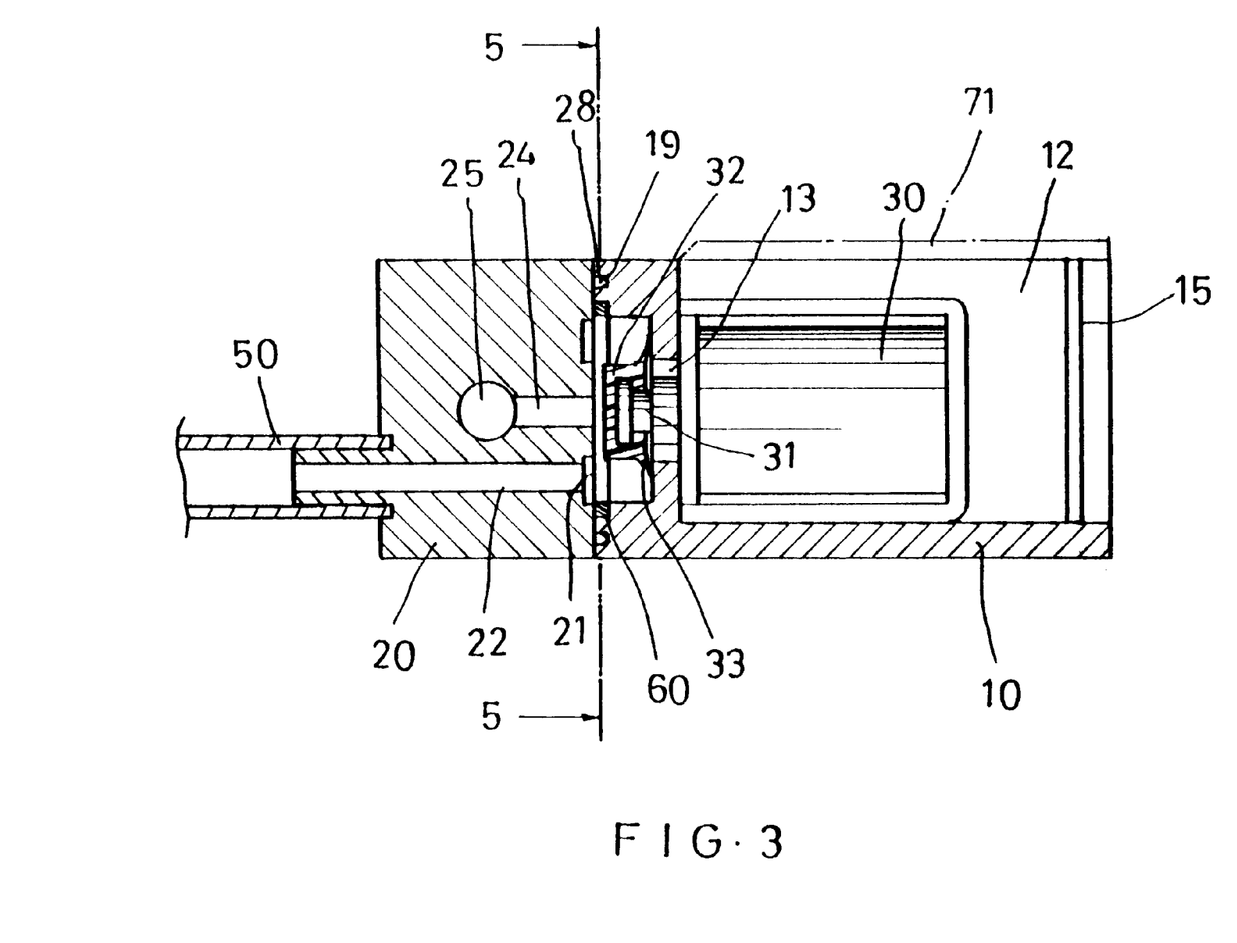
FIG. 3 is a cut-away view of the embodiment shown in FIG. 2 along line 3—3.
Figure 4:
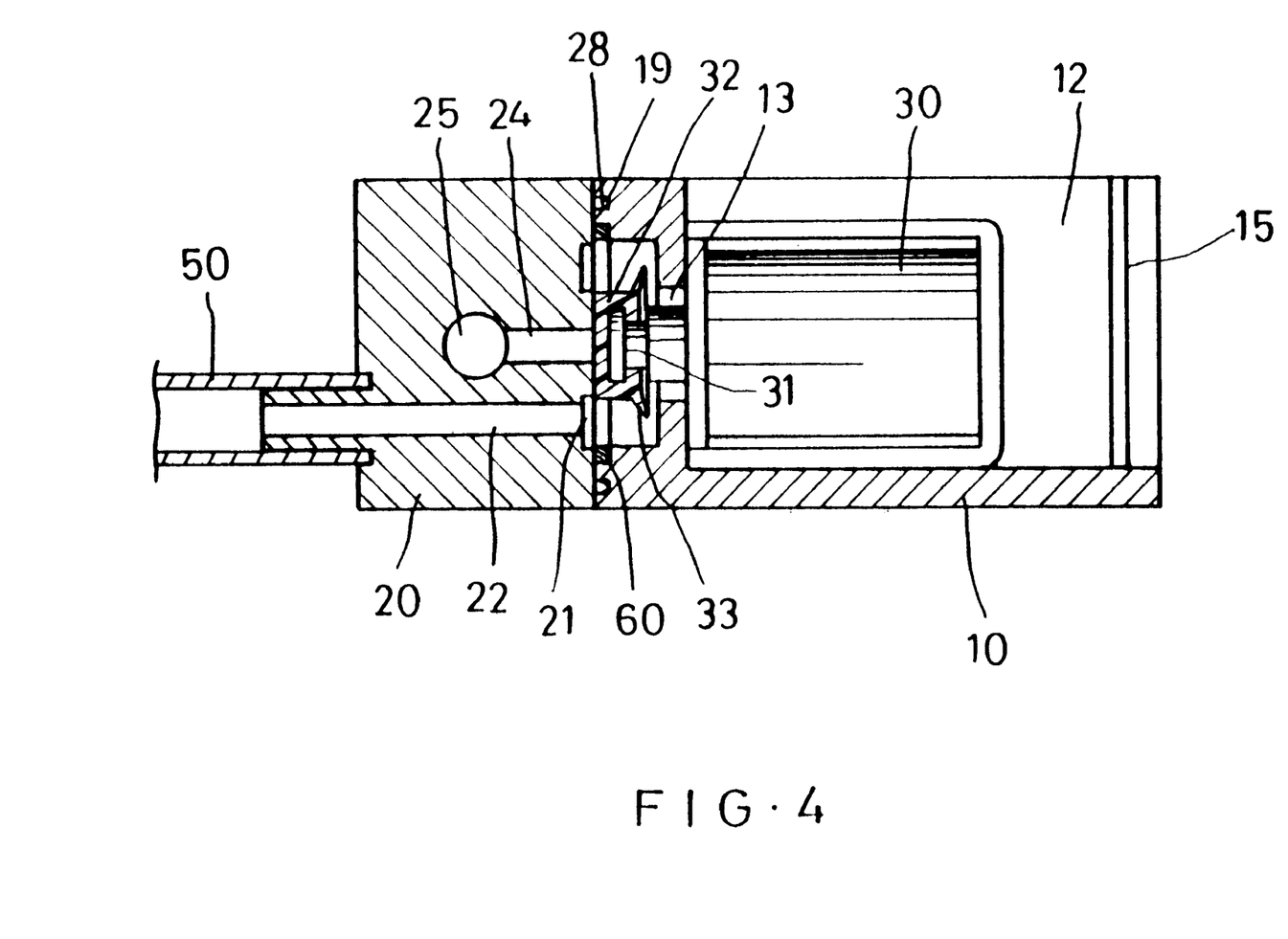
FIG. 4 is a schematic view showing the preferred embodiment in an air out-flow operation.
Figure 5:
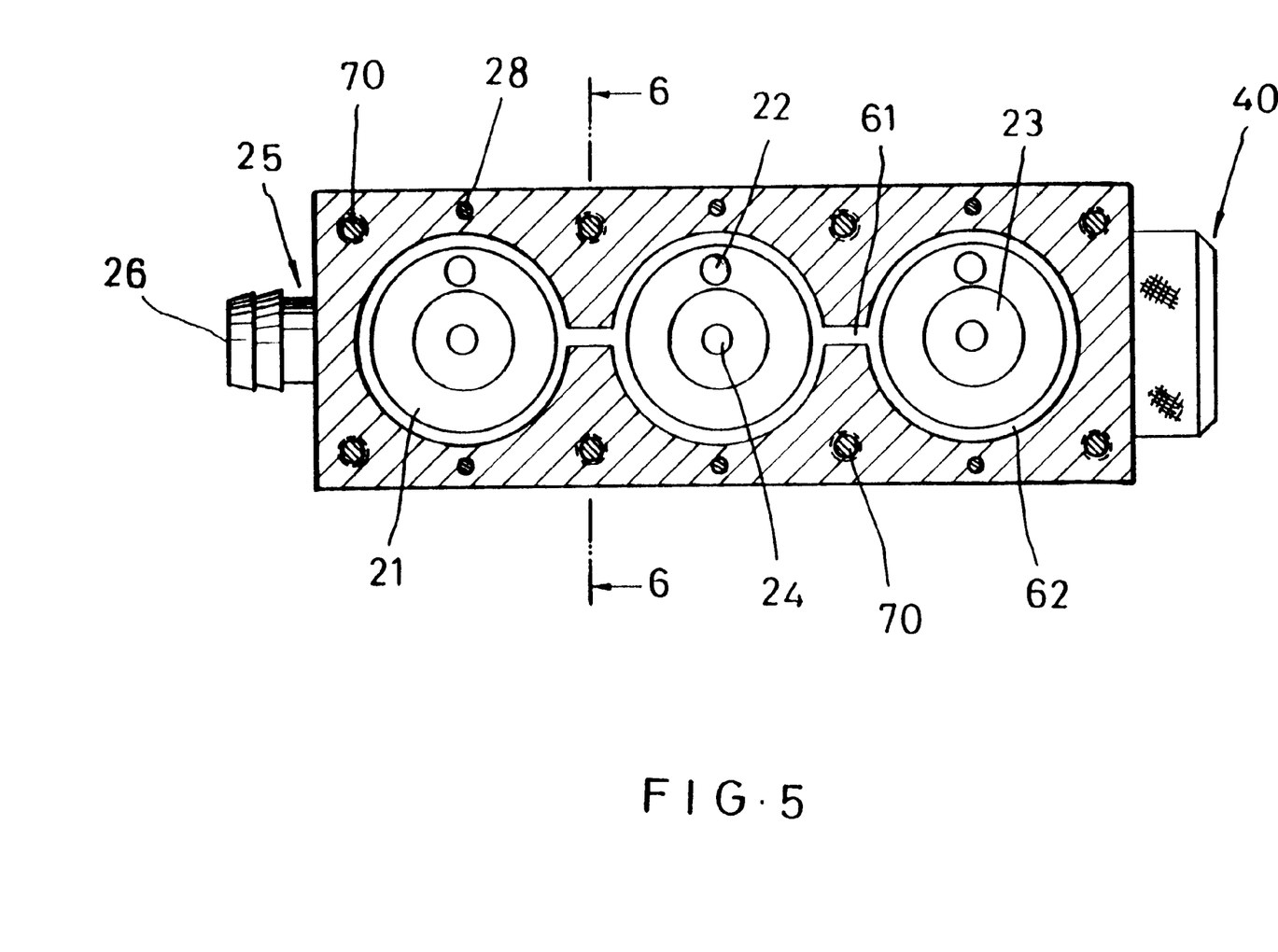
FIG. 5 is a cut-away view of the embodiment shown in FIG. 3 along line 5—5.

In accordance with the present invention, individual through hole 13 is provided on each cabinet 12 of the valve housing 10 for allowing a pin 31 of the electromagnetic valve 30 to penetrate and to align with the outlet of the corresponding second air passage 24 of the air-duct housing 20. While the pin 31 of the electromagnetic valve 30 does not shut the outlet of the second air passage 24, as shown in FIG. 3. the air flow in the second air passage 24 introduced by the pump is then directed to the first air passage 22 of the circular cavity 21, and finally leaves the distribution valve assembly through the air-duct housing 20. In addition, the out-flow air can be properly guided away by an extension pipe 50.

According to the present invention, a gasket 60 can be installed between the valve housing 10 and the air-duct housing 20 for air-tight binding. The gasket 60 is formed by two connection sheets 61 connecting three pieces of circular parts 62 for air-tightly separating the circular cavities 21 on the air-duct housing 20. Each circular part 62 is utilized so to enclose the corresponding circular cavity 21 of the air-duct housing, for forming an independent air-flow device with the corresponding electromagnetic valve 30 as well as the first and the second air passages 22 and 24 of the corresponding circular cavity 21.

The electromagnetic valve 30 further includes a plastic air hat 32 in front the pin 31 thereof. The outer diameter of the skirt 33 of the air hat 32 is larger than the inner diameter of the through hole 13 of the valve housing 10. While the pin 31 of the electromagnetic valve 30 is protruding to block the outlet of the second air passage 24, the skirt 33 of the air hat 32 is separate from the through hole 13 of the valve housing 10. While the pin 31 of the electromagnetic valve 30 is pulled back not to block the outlet of the second air passage 24, the skirt 33 of the air hat 32 will shut the through hole 13 of the valve housing 10; and thus the air introduced by the pump can be regulated through the second air passage 24 and the first air passage 22.

The distribution valve assembly disclosed by the present invention, which is small-size and light-weight, can be applied to air bags, massage chairs, air chairs, and the like. While the air-pumping through the piping 50 is finished, the pin 31 of the corresponding electromagnetic valve 30 is then driven to protrude and shut the air outlet of the second air passage 24. At this time, the air inside the filled air bag will be forced out (through piping 50) by the gravity weight thereof upon, via the first air passage 22, into the circular cavity 21, and consequently exiled out of the valve housing 10 via the through hole 13. As a matter of fact, such a design is not only helpful in leading outflow air; but also promoting the heat dissipation capacity of the electromagnetic valve 30 via the air flowing through.

According to the present invention, the air-duct housing 20 can further include a regulating valve 40 the one end thereof. The regulating valve 40 further comprises a cap 41, a spring 42, and a prong 43. The cap 41, which is fastened to the air-duct housing 20 by screwing engagement or other available engaging means, has a shaft pipe 44 located protrudingly at the center thereinsideof. A plurality of side holes 45 are located around the shaft pipe 44. The shaft pipe 44 allows one end of the prong 43 to plug in from inside of the penetrating passage 25. The spring 41 is installed outside and along the shaft pipe 44 for generating a spring force upon another end of the prong 43 whereof having a flange capable of blocking the shaft pipe 44 as well as the outlet 27 of the penetrating passage 25. While the air pressure inside the penetrating passage 25 is greater than the resistant pressure provided by the spring 42, the prong 43 will be pushed away and surplus air will escape through the outlet 27 of the penetrating passage 25, and exiled via the side holes 45 of the cap 41. The preset regulating pressure of the regulating valve 40 can be adjusted either by the tightness between the cap 41 and the air-duct housing 20, or by the stiffness of the spring 42.

According to the present invention, position slots 15 can be further constructed vertically at the inside walls 14 and at the dividing plates 11 of the valve housing 10, for installing circuit boards 16 along the position slots 15. Furthermore, anchor holes 17 can be constructed at the inside walls 14 of the valve housing 10 for providing wiring passage or for receiving plugs 18.

Figure 6:
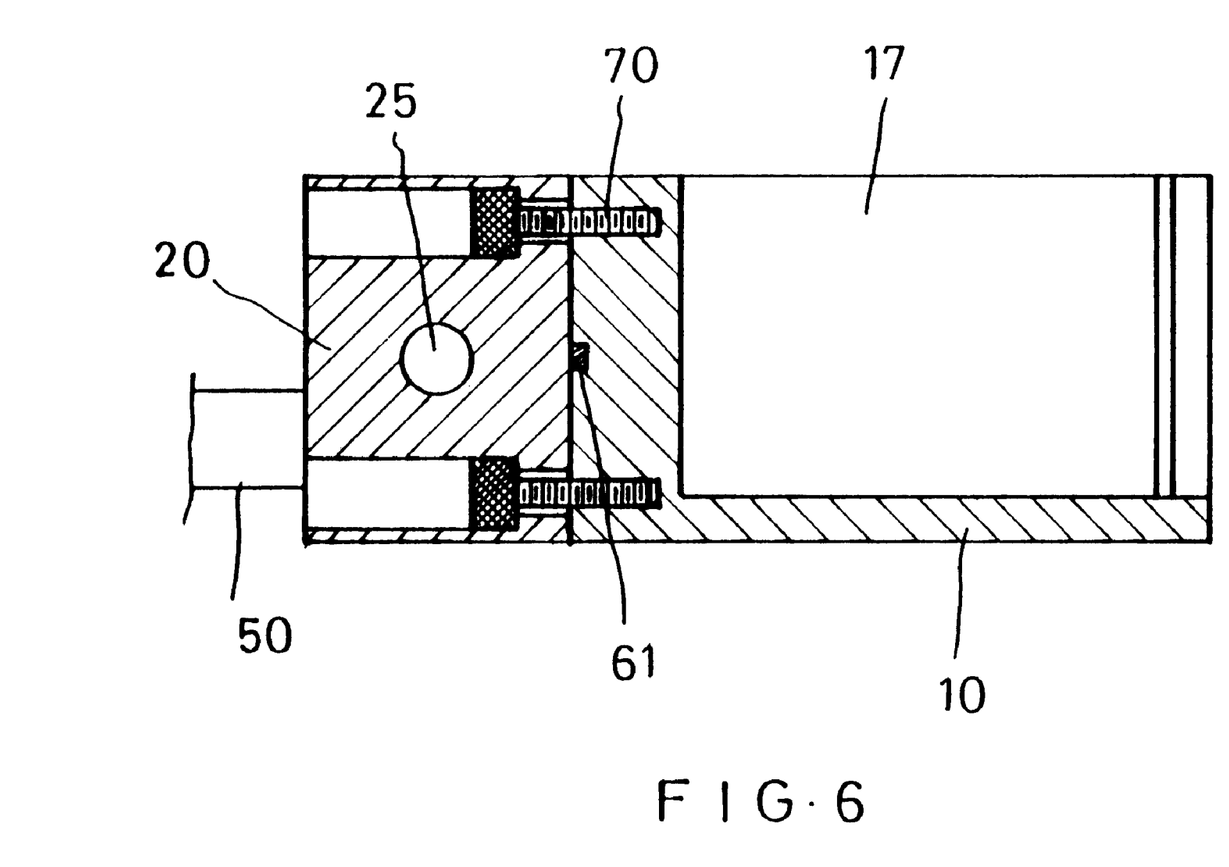
FIG. 6 is a cut-away view of the embodiment shown in FIG. 5 along line 6—6.

As shown in FIG. 6, the valve housing 10 and the air-duct housing 20 can be fastened by multiple screws 70, by aligning multiple locating pins 28 of the air-duct housing 20 with the corresponding pin holes 19 on the valve housing 10 in advance. In addition, a cover plate 71 can be installed firmly to top of the valve housing 10 for preventing foreign object from entering the valve housing 10, as illustrating in FIG. 3.

Figure 7:
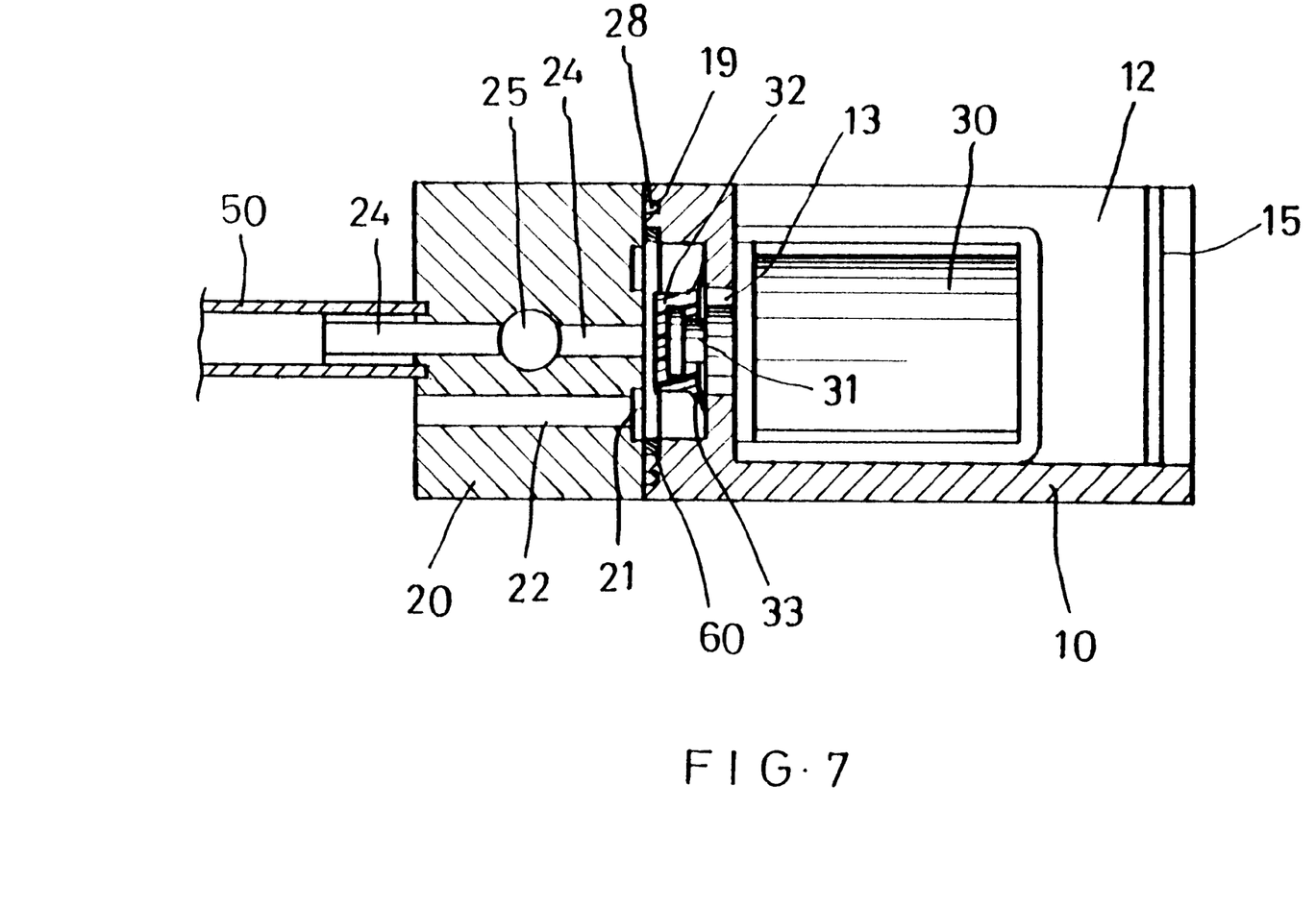
FIG. 7 is a schematic view of another embodiment of the distribution valve assembly in accordance with the present invention.
Figure 8:
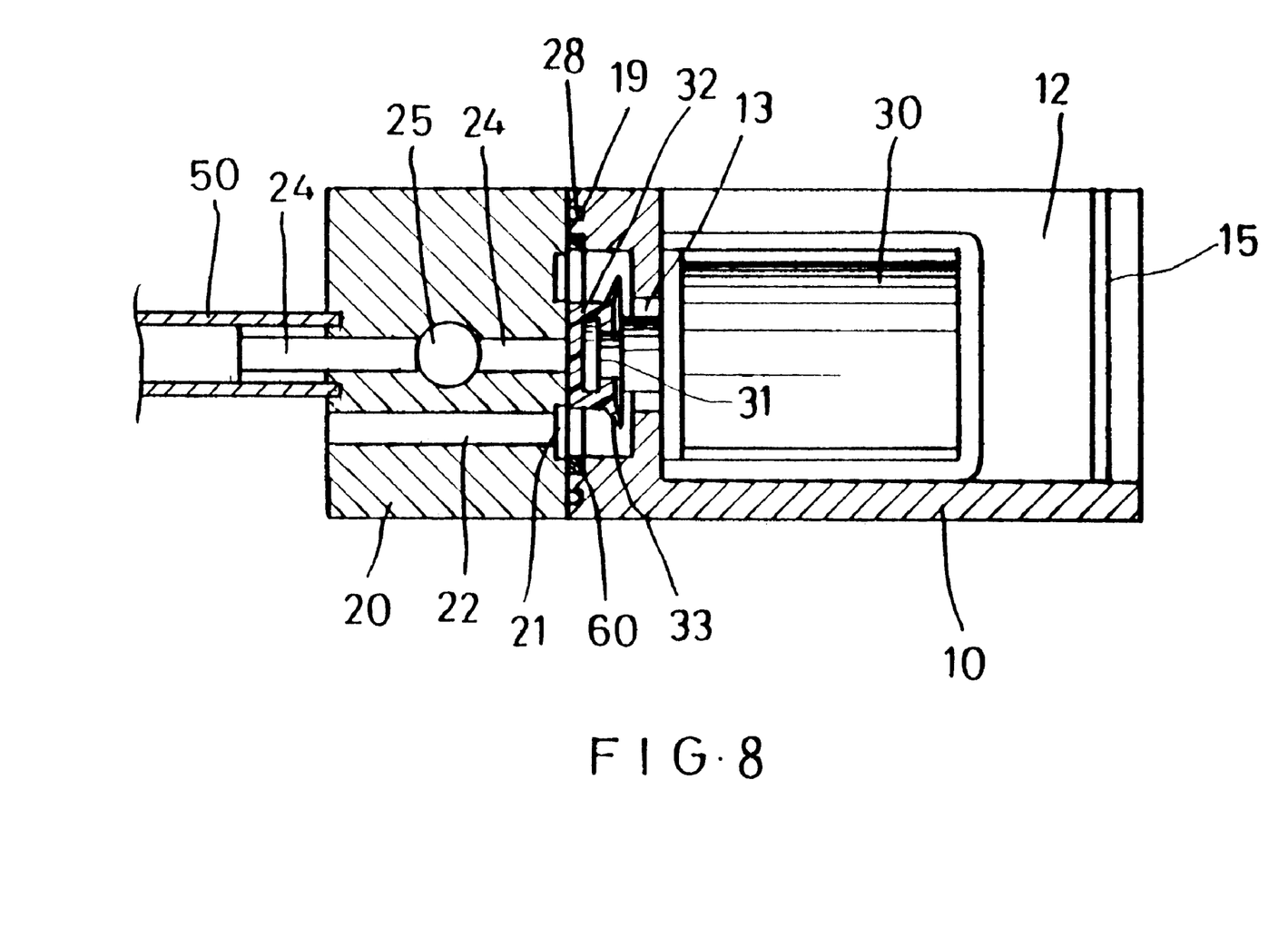
FIG. 8 is a schematic view showing the air in-flow operation of another embodiment of the distribution valve assembly in accordance with the present invention.

Referring now to FIG. 7, another embodiment of the present invention is shown. In this embodiment, the second air passage 24 is extended all the way outside the air-duct housing 20, and directly connects with the exterior piping 50. Now in this embodiment, the first air passage 22 is used as an outflow duct. In normal operation, because the pin 31 of the electromagnetic valve 30 does not block the second air passage 24, the air in the penetrating passage 25 introduced by the pump is exiled outside of the air-duct housing 20 via the second air passage 24 and then the first air passage 22. While the air-pumping is finished, air will be pressed out through the second air passage 24 and then the first air passage 22. While pumping, the pin 31 of the electromagnetic valve 30 is pushed to shut the second air passage 24 as shown in FIG. 8, and the air introduced flows through the penetrating passage 25, the second air passage 22, and the piping 50, to the end of the object waiting to be pumped.

In aforesaid embodiments, three set of electromagnetic valves are included. However, in accordance with the present invention, one, two, or more sets of electromagnetic valves can be applied as well. Also, serial combination of multiple distribution valve assemblies can be applied by aligning all the penetrating passages 25.

In accordance with the present invention, the stroke of the pin 31 of the electromagnetic valve 30 is pretty short. For a small electromagnetic coil to provide sufficient magnetic force for blocking operation, a stronger compression spring inside the electromagnetic valve can be applied. The air hat 32 for both air inlet and outlet operation can also save the space in the cabinet 12.

The installation of the drain valve 40 onto the air-duct housing 20 in accordance with the present invention helps to reduce the volume of the inventive distribution valve assembly. The preset drain pressure of the drain valve 40 should be within the tolerance pressure of the invention to avoid possible damage. While the air pressure inside the piping greater the preset pressure value of the drain valve 40, the air will be drained automatically according to the present invention.

While the present invention has been particularly shown and described with reference to preferred embodiments, it will be understood by those skilled in the art that various changes in form and detail may be without departing from the spirit and scope of the present invention.

I claim:

1. A distribution valve assembly comprising a valve housing and an air-duct housing bound tightly to said valve housing;

said valve housing being divided into a plurality of cabinets for respectively accommodating an electromagnetic valve in each of said cabinets;

said air-duct housing having:
  a plurality of circular cavities, each corresponding one of said cabinets,
  a plurality of first air passages and a plurality of second air passages, each pair of said first and second passages being connected to a first face of each of said circular cavities, and each pair of said first and second passages being arranged in a stacked parallel relationship so as to allow air to flow into said cavity via said second passage and exit via said first passage in a U-shaped manner;
  a penetrating passage which connects to all of said second passages to allow air to flow thereinto, said penetrating passage having an air inlet connecting to a pump at one end thereof, and a drain valve at another end thereof;

a through hole constructed between each said cabinet and each corresponding said circular cavity, wherein a pin of said electromagnetic valve is allowed to move inside said through hole and to align with said second air passage;

further wherein said pin is structured such that when it is pushed backward, it will block said through hole to prevent air to flow said cabinet, and, at the same time, it allows air introduced by said pump to flow into said circular cavity via said second air passage, and then flow out of said air-duct housing via said first passage;

said pin is also structured such that when it is pushed forward it blocks air flow into said second passage and allows air to flow into said cabinet.

2. The distribution valve assembly according to claim 1, wherein between said valve housing and said air-duct housing, further comprises a gasket to separate said circular cavities for forming independent air-flow devices.

3. The distribution valve assembly according to claim 1, wherein said electromagnetic valve further comprises a plastic air hat in front of said pin; wherein said plastic air hat has a skirt with a tapered thickness to allow pressured air to escape from said cabinet and prevent over-pressuring in said cabinet.

4. The distribution valve assembly according to claim 1, wherein said second air passage is extended all the way outside said air-duct housing and directly connects with an exterior piping.

\* \* \* \* \*